July 11, 1967     D. E. BROUSSARD ET AL     3,330,374
METHOD AND APPARATUS FOR CORRECTING ACOUSTICAL VELOCITY
WELL LOGS FOR VARIATION IN BOREHOLE DIAMETER
Filed Feb. 5, 1965     2 Sheets-Sheet 1
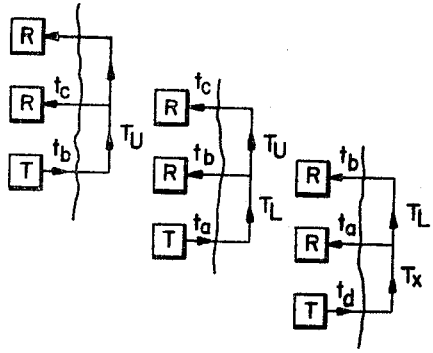
FIG. 1A    FIG. 1B    FIG. 1C
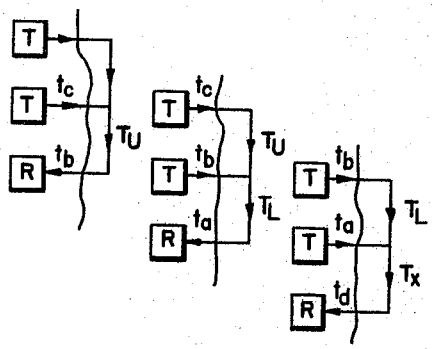
FIG. 2A    FIG. 2B    FIG. 2C
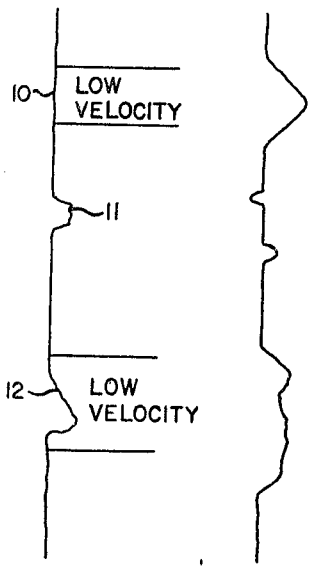
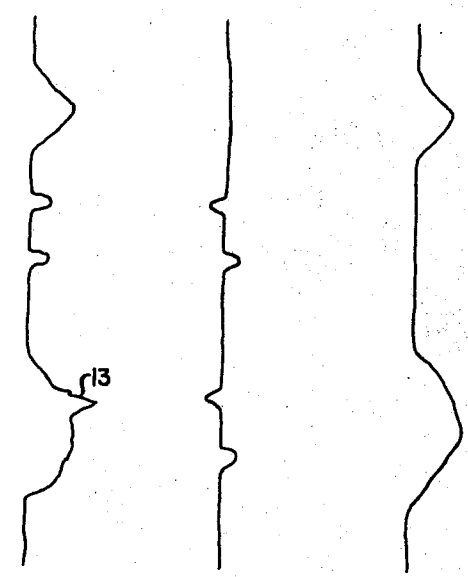
BOREHOLE    NORMAL TWO RECEIVER LOG    NORMAL TRANSMITTER RECEIVER LOG    ROUGHNESS LOG    CORRECTED VELOCITY LOG
FIG. 3A    FIG. 3B    FIG. 3C    FIG. 3D    FIG. 3E
INVENTORS:
D. E. BROUSSARD
C. B. VOGEL
BY: *Theodore F. Bieber*
THEIR ATTORNEY INVENTORS:
D. E. BROUSSARD
C. B. VOGEL
BY: *Theodore E Bieber*
THEIR ATTORNEY 3,330,374
METHOD AND APPARATUS FOR CORRECTING ACOUSTICAL VELOCITY WELL LOGS FOR VARIATION IN BOREHOLE DIAMETER
Douglas E. Broussard and Charles B. Vogel, Houston, Tex., assignors to Shell Oil Company, New York, N.Y., a corporation of Delaware
Filed Feb. 5, 1965, Ser. No. 430,718
8 Claims. (Cl. 181—.5)

This application is a continuation-in-part of an application of Douglas E. Broussard and Charles B. Vogel, Ser. No. 350,015, filed Mar. 6, 1964, entitled "Acoustical Velocity Well Logging," and now abandoned.

This invention relates to well logging and more particularly to a method of acoustical velocity well logging that will provide a more accurate log using presently available three transducer instruments. In addition, the invention provides a method by which one can obtain a log of variations in the diameter of a borehole with respect to depth.

Commonly used commercial logging operations utilize an acoustic transmitter mounted above or below a pair of acoustic receivers to produce differential traveltimes, or $\Delta t$, measurements of the times required for acoustic impulses to travel across the distance that separates the receivers. In such operations the transmitter is periodically energized to generate an acoustic impulse that travels through the liquid in the borehole to the earth formations surrounding the borehole and then travels through the earth formations to spaced points from which it again travels through the liquid in the borehole to reach each of the receivers. Such traveltime measurements are produced by numerous procedures, such as: (a) transmitting, to surface located measuring units, a pair of electric signals that indicate the times at which each acoustic impulse arrives at each of the receivers and measuring the time between the pair of signals; (b) similarly transmitting a first pair of electrical signals that indicate the times at which a first acoustic impulse appears at the transmitter and the nearest receiver, then transmitting a second pair of electrical signals that indicate the times at which a second acoustic impulse appears at the transmitter and the farthest receiver, and then measuring the difference between the times separating the signals in each of the pairs of electrical signals; or (c) producing similar electrical signals and similar measurements within the downhole instrument and transmitting to a surface location only electrical signals that correspond to the quantities measured; or the like operating procedures. Where the measurement of the traveltimes between the pair of receivers involves the generation of a pair of acoustic impulses, the two impulses are produced and their arrival times are detected before the tool has been moved by any significant amount of distance within the borehole.

The $\Delta t$ measurements, which indicate the times required for acoustic impulses to travel over an interval defined by a pair of transducers that are operated similarly in respect to transmitting or receiving acoustic impulses, are generally more accurate in respect to the acoustic properties of the earth formations than are the total traveltime measurements. The total traveltime measurements indicate the time between the appearances of an acoustic impulse at, respectively, a transmitter and a receiver. In the $\Delta t$ measurements, one of the time intervals during which the acoustic impulses are traveling through the liquid in the borehole is eliminated by the subtraction to obtain the differences between the times required for the acoustic impulses to arrive at each of the receivers. In the total traveltime measurements both of the times during which each acoustic impulse is traveling through the liquid in the borehole are included.

Methods and apparatus that are suitable for producing $\Delta t$ measurements of the traveltime of acoustic impulses over a measuring interval defined by transducers that are operating alike in respect to transmitting and receiving acoustic impulses are described in Patent 2,708,485. That patent also describes a method for producing corrected $\Delta t$ measurements over such a measuring interval. In the patented method the corrected $\Delta t$ measurements are produced by, for example, using a TRRT arrangement of transducers in which one transmitter is mounted above a pair of receivers and another transmitter is mounted below that pair. Using this arrangement a first $\Delta t$ measurement is made by, for example, using the upper transmitter to provide a point from which to measure the difference between the times required for impulses to arrive at each of the receivers. A second $\Delta t$ measurement is made by similarly using the lower transmitter. The two $\Delta t$ measurements are then averaged to provide a corrected $\Delta t$ measurement from which both of the times during which the acoustic impulses are traveling through the liquid in the borehole have been eliminated.

Although the 2,708,485 method and apparatus is effective in producing corrected $\Delta t$ measurements, it requires a relatively complicated downhole instrument that contains at least a TRRT (or RTTR) arrangement of the transducers. In addition, even when using the operating procedure in which each of the $\Delta t$ measurements are made while each acoustic impulse is passing through the measuring interval two impulses must be generated and received, to provide two $\Delta t$ measurements, before the instrument is allowed to move a significant distance within the borehole, and this reduces the rate at which the logging can be accomplished.

Accordingly, it is the principal object of this invention to provide a new method for obtaining an acoustical velocity log that is corrected for changes in the diameter of the borehole.

A further object of this invention is to provide a method for obtaining an acoustical log, utilizing a logging tool that may have as few as three transducers mounted thereon, wherein the velocity log is corrected for changes in the diameter of the borehole.

A still further object of this invention is to provide a method for obtaining a log indicating the variations in the diameter of a borehole with depth, said log being obtained by a velocity logging tool having as few as three transducers deposed thereon.

A still further object of this invention is to provide a method for obtaining an acoustical velocity log that is corrected for changes in the diameter of a borehole with depth, both logs being recorded by analog equipment.

A still further object of this invention is to provide a method for obtaining a velocity log that is corrected for changes in the borehole diameter and a log that indicates the variations in the diameter of the borehole with depth, said logs being obtained by the use of a digital recording and computing system.

The above objects and advantages of this invention, in respect to producing acoustic logs that are corrected for changes in the diameter of the borehole, are obtained by traversing a portion of the borehole with a logging tool that contains at least three transducers and is operated to provide the following measurements and combinations of measurement information. The term transducer is used to describe a device that is capable of being energized by a discrete electrical signal to generate a corresponding discrete acoustical signal having a known time correspondence with the occurrence of the electrical signal, or that is capable of receiving an acoustical signal and converting it to an electrical signal having a known time correspondence with the arrival of the acoustical signal.

The terms used in the following discussion are defined as follows:

$\Delta t$ refers to the time interval required for an acoustical impulse to travel the distance that separates two transducers of the same type, i.e., two receivers or two transmitters;

T refers to a transmitting transducer;

R refers to a receiving transducer;

$\Delta t$U refers to a $\Delta t$ measured over the upper of two adjacent equal length depth intervals;

$\Delta t$L refers to a $\Delta t$ measured over the lower of two adjacent equal length depth intervals;

$tt$ refers to the total time interval required for an acoustical impulse to travel from a transmitter to a receiver;

$tt$L refers to a $tt$ measured over the lower of two adjacent equal length depth intervals;

$tt$U refers to a $tt$ measured over the upper of two adjacent equal length depth intervals.

*First*, three transducers are operated to produce unit differential traveltime, or $\Delta t$, measurements by maintaining two transducers that are operated alike, in respect to transmitting and receiving acoustic impulses, at the ends of a $\Delta t$ measuring interval (i.e., the distance between such transducers) and producing a quantity related to the difference between the time required for acoustic impulses to travel between each of them and a point that is located a fixed distance above or below the $\Delta t$ measuring interval. This can be accomplished by, for example, maintaining two receivers above a transmitter, in an RRT arrangement, maintaining a 5-foot spacing between each pair of the transducers, and producing a quantity related to the difference between the times at which an acoustic impulse arrives at each of the receivers. Alternatively, it can be accomplished by analogous operations using a similarly spaced TRR or TTR arrangement and measuring the difference between the $tt$ measurements over the respective long and short TR measuring intervals, to produce the unit $\Delta t$ measurements. *Second*, unit $tt$ measurements are produced by maintaining a transmitter and a receiver at the ends of a $tt$ measuring interval of a unit length that is equal to or a multiple of the $\Delta t$ measuring interval and producing a quantity related to the time required for an acoustic impulse to travel from the transmitter to the receiver. This can be accomplished by, for example, measuring the $tt$ over the 5-foot TR measuring interval of either transducer arrangement described above. If desired, the $tt$ measuring interval can comprise transducers which are not used in the $\Delta t$ measurements and which are located either above or below the $\Delta t$ measuring interval. *Third*, the unit $\Delta t$ and the unit $tt$ measurements are made across each of two adjacent depth intervals that are each equal to a unit measuring interval and the quantities related to the measurements are combined in a manner dictated by whether the point utilized in producing each unit $\Delta t$ measurement is located above or below the $\Delta t$ measuring interval. In the RRT (or TTR) arrangement described above, where the point utilized in each unit $\Delta t$ measurement is below the $\Delta t$ measuring interval, the corrected $\Delta t$ for the lower one of the pair of adjacent depth intervals, corrected $\Delta t$L, is produced by combining (1) the unit $\Delta t$ measurement across the upper one of that pair of depth intervals, $\Delta t$U; (2) the unit $\Delta t$ measurement across the lower one of that pair of depth intervals, $\Delta t$L; and the $tt$ measurement across each of those depth intervals, $tt$U and $tt$L; in accordance with the formula Corrected $\Delta t L = \frac{1}{2}(\Delta t U + \Delta t L + tt L - tt U)$ In an analogous arrangement in which the same array of transducers is inverted, where the point utilized in each of the unit $\Delta t$ measurements is above the $\Delta t$ measuring interval, the corrected $\Delta t$ for the upper interval, corrected $\Delta t$U, is obtained by combining measurements in accordance with the formula Corrected $\Delta t U = \frac{1}{2}(\Delta t U + \Delta t L + tt U - tt L)$ The above objects and advantages of this invention, in respect to producing an acoustic log of variations in the diameter of the borehole, are obtained by, in effect, producing quantities related to both the corrected $\Delta t$ measurements and to the difference between the corrected $\Delta t$ measurements and the corresponding unit $\Delta t$ measurements that are obtained when a unit $\Delta t$ measuring interval (equal to the one used in producing the corrected $\Delta t$ measurements) is adjacent to the depth intervals over which the corrected $\Delta t$ measurements have been obtained. This can be accomplished by, for example, (a) producing the corrected $\Delta t$U measurements in the manner described above and subtracting the unit $\Delta t$U measurements, (b) producing the corrected $\Delta t$L measurements in the manner described above and subtracting them from the unit $\Delta t$L measurements, (c) producing the corrected $\Delta t$ measurements by the TRRT (or RTTR) averaging procedures (e.g., according to U.S. Patent 2,708,485) and subtracting the corresponding RR (or TT) $\Delta t$ measurements that are produced by such a transducer arrangement, (d) producing a pair of quantities corresponding to a unit $\Delta t$ measurement utilizing the upper transmitter (or receiver) and a unit $\Delta t$ measurement utilizing the lower transmitter (or receiver) of a TRRT (or RTTR) arrangement and producing a quantity corresponding to one half of the difference between said pair of quantities. It should be noted that in respect to producing the log of the borehole diameter variations the procedures (c) and (d) are entirely equivalent except for a possible change in the sign of the quantity that corresponds to the variation in the diameter of the borehole.

If $\Delta t'$ is the unit $\Delta t$ measurement utilizing the lower transmitter and $\Delta t''$ is the unit $\Delta t$ measurement utilizing the upper transmitter, where the transmitter arrangement is TRRT, then:

Corrected $\Delta t = \frac{1}{2}(\Delta t' + \Delta t'')$ and the variation in the borehole diameter roughness is, for example, $$\text{Roughness} = \frac{1}{2}(\Delta t' + \Delta t'') - \Delta t'$$
$$= \frac{\Delta t' + \Delta t'' - 2\Delta t'}{2} = \frac{1}{2}(\Delta t'' - \Delta t')$$

The above equations are solved by the mathematical operations specified in (c) and (d) respectively.

The above objects and advantages of this invention will be more easily understood from the following detailed description of preferred embodiments when taken in conjunction with the attached drawings in which:

FIGURES 1A, 1B and 1C are a series of schematic drawings showing a single transmitter, two receiver logging tool positioned at successive levels along the borehole to obtain the data required to practice the method of this invention;

FIGURES 2A, 2B and 2C are a series of schematic drawings of a two-transmitter, single receiver logging tool positioned at successive levels along the borehole to obtain the information required to practice the method of this invention;

FIGURE 3A is a profile at one side of a borehole and FIGURES 3B–3E are various logging records obtained by using the present commercial logging tools and the logging records obtained utilizing the method of this invention;

Figure 4:
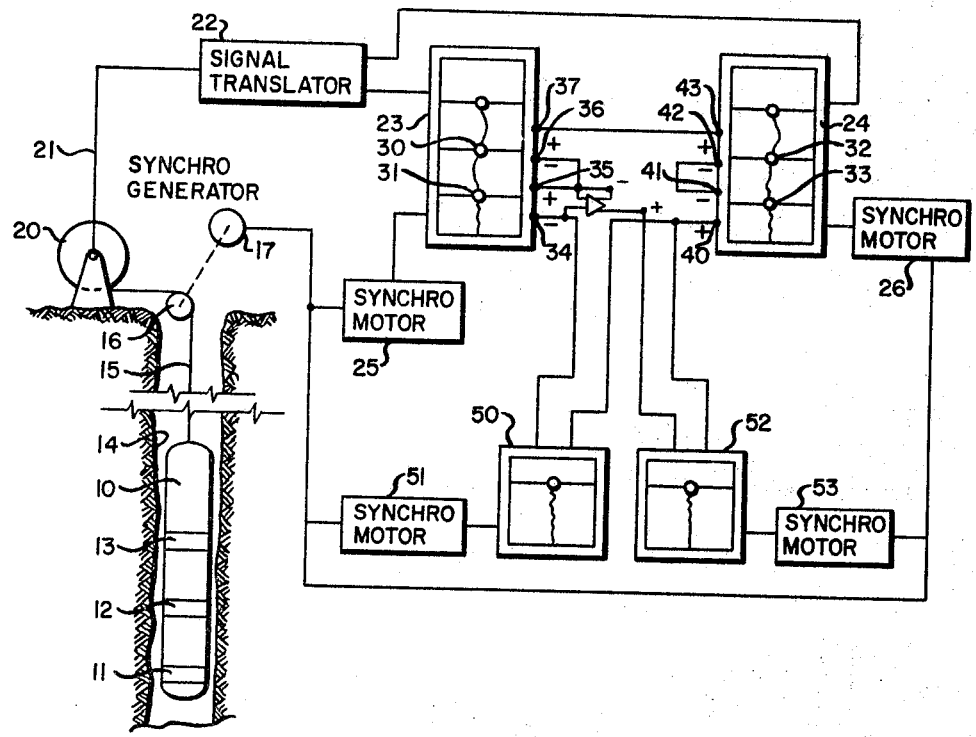
FIGURE 4 is a block diagram form of a logging system suitable for practicing the method of this invention.

As explained above, this invention may utilize a logging tool having only three transducers, mounted thereon. In such an arrangement the transducers are spaced from each other a unit distance and the logging system is designed to generate a plurality of acoustical impulses for each unit distance of travel of the tool through the borehole. The transducers may be either transmitting transducers which will generate an acoustical impulse when supplied with a suitable electrical current or receiving transducers which will generate a related electrical signal upon the receipt of an acoustical impulse. Transducers of a magnetostrictive type can function as either transmitting or receiving transducers. In FIGURES 1A–1C, three blocks labeled T, R and R are shown to designate a transmitter and two receivers of a downhole tool of an acoustical logging system. Further, the receivers are positioned fixed unit distances above the transmitter, for example, a 5-foot spacing between the transmitter and the first receiver and an additional five feet between the first receiver and the second receiver. Also shown in these views are vectors $t_a$, $t_b$, $t_c$, $t_d$, $T_L$, $T_u$, and $T_x$. More particularly, vectors $t_a$, $t_b$, $t_c$ and $t_d$ represent the traveltimes of the acoustical impulse through the borehole at various locations along the borehole. $T_L$, $T_u$, and $T_x$ represent the travel times of the acoustical impulse through the formations surrounding the borehole at the locations shown. Utilizing the notation shown in FIGURES 1A–1C, the following traveltimes may be measured.

The term $ttU$ refers to the $tt$ measurement between the transmitter and the near receiver when they are disposed adjacent the upper interval; the term $ttL$ refers to total travel time between transmitter and the near receiver when they are disposed adjacent the lower interval; the term $\Delta tU$ refers to the differential travel time between the two receivers when the receivers are disposed adjacent the upper interval; and the term $\Delta tL$ refers to the travel time between the two receivers when the receivers are disposed adjacent the lower interval described above.

$$ttU = t_b + T_U + t_c \quad \text{(FIGURE 1A)}$$
$$ttL = t_a + T_L + t_b \quad \text{(FIGURE 1B)}$$
$$\Delta tU = t_a + T_L + T_U + t_c - t_a - T_L - t_b$$
$$= t_c + T_U - t_b \quad \text{(FIGURE 1B)}$$
$$\Delta tL = t_d + T_X + T_L + t_b - t_d - T_X - t_a$$
$$= t_b + T_L - t_a \quad \text{(FIGURE 1C)}$$

Adding:
$$\Delta tU + \Delta tL = t_c + T_U - t_b + t_b + T_L - t_a = t_c + T_U + T_L - t_a$$

Subtracting:
$$ttU - ttL = t_b + T_U + t_c - t_a - T_L - t_b = t_c + T_U - T_L - t_a$$

Subtracting:
$$[\Delta tU + \Delta tL] - [ttU - ttL] = 2T_L$$

Dividing by 2, corrected
$$\Delta tL = T_L$$

In this example $ttU$ and $ttL$ are the unit total traveltimes over any adjacent depth intervals that are each equal to the unit measuring interval, e.g., 5 feet. The terms $\Delta tU$ and $\Delta tL$ are the unit differential traveltimes corresponding to the difference between the times required for acoustic impulses to travel between each receiver and the transmitter, the latter being situated at a point a fixed distance below the $\Delta t$ measuring interval, when that measuring interval is opposite to, respectively, the upper and lower ones of the adjacent depth intervals. Thus, Corrected $\Delta tL = \frac{1}{2}(\Delta tU + \Delta tL + ttL - ttU)$ The above procedure for determining the corrected $\Delta tL$ amounts to one way of averaging a $\Delta tL$ measurement provided by, e.g., 10-foot and 5-foot transmitter-to-receiver measurements from a point below the 5-foot lower depth interval shown in FIGURES 1A–1C with a $\Delta tL$ measurement provided by similar measurements from a point above that interval. The first of such a $\Delta tL$ measurement utilizes the vectors:

$$t_a + T_L + T_U + t_c - (t_b + T_U + t_c)$$

The second utilizes the vectors:

$$t_d + T_X + T_L + t_b - (t_d + T_X + t_a)$$

Their sum comprises:

$2T_L$, which is equal to $\Delta tU + \Delta tL + ttL - ttU$, or $2\Delta tL$

Thus, where desirable, the results of producing $\Delta tU$ and $\Delta tL$ and combining them according to the formula:

Corrected $\Delta tL = \frac{1}{2}(\Delta tU + \Delta tL + ttL - ttU)$ can be obtained by a direct combination of the corresponding total traveltimes over the long and short transmitter-to-receiver intervals, e.g.:

$+ t_a + T_L + T_U + t_c$ ----Long TR over both depth intervals.
$- (t_b + T_U + t_c)$ -----Short TR over upper depth interval.
$+ t_d + T_X + T_L + t_b$ ---Long TR over lower and next lower depth intervals.
$- (t_d + T_X + t_a)$ -----Short TR over next lower depth interval.

$2T_L$ --------Sum of $\Delta tL$ measurements utilizing, respectively, a point above and a point below the lower depth interval.

It is easily seen from the above relationships that the differential traveltime between two receivers is equal to the true differential traveltime only if the quantities $t_c$, $t_b$ are in fact equal. These quantities or traveltimes will only be equal when the borehole is substantially of a uniform diameter over the interval between the two receivers. In the case of a caving or enlargement of the borehole, one of these traveltimes will be considerably larger than the other, thus introducing a considerable error in the acoustic velocity log. For example, if one assumes that the traveltime of acoustic energy through the liquid filling the borehole is approximately 5,000 feet per second while the travel time of an average formation is approximately 10–15,000 feet per second, then a 6-inch enlargement in the borehole diameter can introduce approximately 20% error in the measured traveltime.

Referring now to FIGURES 2A–2C, there is shown a similar tool to that shown in FIGURES 1A–1C but utilizing two transmitters and a single receiver. Using the same notation as that used previously, the following relationships can be obtained.

Here $\Delta tU$ and $\Delta tL$ are the differential traveltimes between the transmitters when the transmitters are located, respectively, opposite the upper and lower intervals; $ttU$ is the total traveltime from the lower transmitter to the receiver when the receiver is at the bottom of the upper depth interval (FIGURE 2A); and $ttL$ is the total traveltime $ttL$ from the lower transmitter to the receiver when the receiver is at the bottom of the lower depth interval (FIGURE 2B):

$\Delta tU =$
$$t_c + T_U + T_L + t_a - t_b - T_L - t_a = t_c + T_U - t_b$$
(FIGURE 2B)

$\Delta tL =$
$$t_b + T_L + T_X + t_d - t_a - T_X - t_d = t_b + T_L - t_a$$
(FIGURE 2C)

$ttU =$
$$t_c + T_U + t_b$$
(FIGURE 2A)

$ttL$
$$t_b + T_L + T_A$$
(FIGURE 2B)

Addition and subtraction of terms corresponding to the first embodiment leads to the relationship:

$$T_L = \frac{1}{2}([\Delta tU + \Delta tL] - [ttU - ttL])$$

Referring to the above equation it is seen that the true traveltime over the lower interval can be obtained by adding together the differential traveltimes between the two transmitters over the upper and the lower intervals, $\Delta tU$ and $\Delta tL$, and subtracting the transmitter-receiver traveltime over the lower interval, $ttL$, from the transmitter-receiver traveltime over the upper interval, $ttU$. The two quantities are then subtracted and the result divided by two to obtain the corrected differential traveltime over the lower interval, corrected $\Delta tL$.

While the above illustrates the method of this invention with relation to two configurations of logging tools, obviously other configurations will give similar results. As explained, the traveltime measurements can be made in the downhole tool with signals proportional to the quantities measured being transmitted to the surface. Further, the transmitter can be placed on top of the receivers in FIGURES 1A–1C. As stated above, the only requirement for the downhole logging tool is that it include at least three transducers, two of the transducers being of the same type. Further, if the tool contains only three transducers, the two transducers that are the same type are to be located to one side of the third transducer and, in the simplest embodiment, all of the transducers are to be spaced a unit distance apart. Of course, in the case of a tool employing two transmitters, as shown in FIGURES 2A–2C, the two transmitters are necessarily fired in succession within a relatively closely spaced time interval. The time interval between the firing of the two transmitters in this type of tool is very short compared to the speed of travel of the tool through the borehole. Thus, for practical purposes the differential traveltimes measured by a two-transmitter tool are substantially equal to the differential traveltime measured over the same interval by a single-transmitter two-receiver tool.

Where it is desirable to provide measurements between a relatively closely spaced pair of transducers that are operated alike in respect to the transmissions and receptions of acoustic impulses, such a pair of transducers are preferably mounted at the opposite ends of a measuring interval having a length of $1/n$ times the length of the interval between a transmitter and a receiver, where $n$ is an integer, and $n$ measurements across the interval demarked by said like transducers (obtained when that interval is adjacent to each of a series of adjacent depth intervals having a length equal to $n$) are summed to obtain each of the unit differential traveltime measurements. The latter are then combined with the unit total traveltime measurements in accordance with the present invention. For example, in a tool of the type shown in FIGURES 1A–1C, where the R to R spacing is 2 feet and the T to R spacing is 4 feet, the quantity related to $\Delta tU$ comprises the sum of a quantity related to the traveltime of acoustic impulses traveling across the RR measuring interval when that interval is adjacent to the lower half of the illustrated upper depth interval plus a quantity related to the traveltime of such impulses across the RR measuring interval when it is adjacent to the upper half of the illustrated upper depth interval.

Referring now to FIGURES 3A–3E, there is shown a profile of one side of a borehole and a series of logging records obtained by an acoustical logging tool passing through a borehole having the profile shown. More particularly, in FIGURE 3A is shown the profile of the borehole in which it is indicated that there is a low velocity formation 10 near the top of the figure, a caved section 11 at the center of the figure and a second caved section 12 near the bottom of the figure. The second caved section 12 exists in a low velocity formation. When a normal two-receiver velocity logging tool is passed through a borehole that penetrates the formation shown in FIGURE 3A, a log similar to that shown in FIGURE 3B would be obtained. More particularly, the log would indicate the low velocity section 10, caved section 11 would be indicated by a decrease in traveltime followed by an increase in traveltime. This type of log can be interpreted by those possessing sufficient skill in the art as indiacting a caved section having an overall length or extent substantially equal to the spacing between the two changes in the traveltime curve. The normal two-receiver logging tool will then indicate the second low velocity section 12 and the caved section by an increase in the traveltime and then a leveling off followed by a decrease in travelling time. This type of log is very difficult to interpret because, in effect, it indicates that the low velocity section has a higher velocity section disposed therein. The log in FIGURE 3B is, as indicated by the discussion, a traveltime log whose reciprocal would be equal to the true velocity. The FIGURE 3C illustrates the normal transmitter-receiver log in which the low velocity section 10 is illustrated in the same manner as in FIGURE 3B so that the caved section 11 is illustrated by a slight increase in the traveltime each time a transducer is adjacent to that section. The low velocity section 12 is indicated as a slight increase in the traveltime in addition with a peak 13 disposed thereon. This again results in a difficult problem of interpretation since it is not clear whether the peak 13 would indicate a still lower velocity formation or merely a caved section. FIGURE 3E illustrates the corrected velocity log which would be obtained by following the method of this invention. In this case, the low velocity section 10 is illustrated as having slightly increased traveltime and the low velocity section 12 is similarly indicated. The caved section 11 is not indicated in the log shown in FIGURE 3E since any indication of this caved section is removed by the method of this invention. The provision of the roughness log by the method of this invention will preserve the indication of the caved sections 11 and 12 as shown in the log of FIGURE 3D that is titled a roughness log. From an inspection of the logs in FIGURES 3D and 3E, it is seen that the roughness log clearly indicates those portions of the borehole that are enlarged while the corrected velocity log correctly indicates the true velocity of the acoustic impulses through the formations.

The roughness log shown in FIGURE 3D is, in effect, the difference between the corrected $\Delta tL$ and the unit $\Delta tL$ measurements across each of the lower ones of each pair of adjacent depth intervals encountered by the two measuring intervals defined by the transmitter positioned below the pair of receivers. Using notations similar to those used regarding FIGURES 1A–1C:

The unit $\Delta tL = t_b + T_L - T_a$

The corrected $\Delta tL = T_L$

Subtracting:

Roughness $= t_b - t_a$

Referring now to FIGURE 4, there is shown a system for performing the method of this invention. More particularly, there is shown a downhole logging tool 10 having a transmitting unit 11, a receiving unit 12 and a second receiving unit 13. As explained above, since only three transducers are used, the receiver 12 is spaced a unit distance from the transmitter 11 with the receiver 13 being spaced the same unit distance from the receiver 12. The logging tool 10, in addition, includes the necessary electronic circuits for energizing the transmitter 11 to generate periodic acoustical impulses and the necessary amplifiers and switching circuits for the receivers 12 and 13. All of these circuits are well known to those skilled in the art. The tool 10 is coupled to a cable 15 which, in addition to supplying the necessary electrical circuits for the logging tool, also provides the mechanical strength required to raise and lower the tool in the borehole. The cable 21 passes over a measuring sheave 16 that is coupled to a Selysn generator 17. Thus, the travel of the tool through the borehole will be measured and converted to a related electrical quantity. The cable is stored on a suitable reel 20 that contains suitable slip rings for removing the electrical signals generated by the receivers as well as transmitting electrical signals to the tool. The slip ring assembly is coupled by means of a lead 21 to a signal translator 22. The signal translator 22 should be designed to convert the time interval between the generation of the acoustic impulse by the transmitter 11 and receiving of the impulse by the near receiver 12 to an electrical analog signal. Similarly, the signal translator should convert the time required for the acoustic impulse to travel between the receivers 12 and 13 to an electrical analog signal. Suitable time measuring circuits and circuits for periodically triggering the transmitter 11 are shown in the prior art and are well known to those skilled in the art of acoustical velocity well logging. Thus, the circuit for signal translator 22 will not be further described.

Signal transmitter 22 is coupled to two recording units 23 and 24. The recording unit 23 records the analog signal representing the traveltime of the acoustic impulses between the two receivers 12 and 13 while the recorder 24 records the traveltime of the acoustic impulses between the transmitter 11 and the near receiver 12. The recorders 23 and 24 are a combination of a normal pen-recorder type of chart recorder and a curve follower that will follow the recorded curve and generate a related electrical signal. The curve followers that follow the recorded curve can produce at the terminals shown the respective voltages that are representative of the corresponding deflections of the followed curve. In practice, a battery may be incorporated with curve follower circuitry in a suitable manner to cooperate with a variable potentiometer to produce the desired voltages having the polarities shown in FIGURE 4. Suitable recorders for this use are manufactured by the F. L. Mosley Co. of Pasadena, Calif. and described in data sheets 80a, F2 and 2D–5 of their Catalog L. More particularly, these recorders are known as Mosley Model 2D–5 recorders. The recorders have been modified to incorporate synchromotors 25 and 26 in place of the normal chart drive motors used in these recorders. Synchromotors 25 and 26 are coupled to the Selsyn or synchrogenerator 17 and thus the chart record will be driven in synchronism with the travel of the tool 10 through the borehole. The recorder 23 is provided with two curve following units 30 and 31 and recorder 24 is provided with curve following unit 32 and 33. The curve followers are positioned along the chart record a distance corresponding to the unit distance between the transmitter and receivers in the tool 10. As explained above, if this interval is five feet, then the curve followers would be placed along the chart record at five-foot intervals of the chart record.

The above curve followers 30 and 31 and associated circuits will generate voltages at terminals 34–37 having the polarities shown. Similarly, the recorder 24 will generate voltages at terminals 40–43 having the polarities shown. More particularly, the voltages appearing on the terminals 34 and 35 will represent the traveltimes of the acoustic impulses between the two receivers when the receivers are positioned adjacent the lower ones of each pair of intervals encountered, as shown in FIGURE 1. Also inserted beween the terminals 34 and 35 is a unity gain inverting amplifier 39 that reverses the polarity of the signal at the terminals 34 and 35 without changing the magnitude of the signal. Similarly, the signal appearing the the terminals 36 and 37 will indicate the traveltime between the two receivers when they are positioned adjacent the upper ones of each pair of intervals encountered, as shown in FIGURE 1. The signals appearing on the terminals 40 and 41 will represent the traveltimes of the acoustic impulses between the transmitter and the receiver when they are placed adjacent the lower ones of the intervals, as shown in FIGURE 1, while the signals appearing on the terminals 42 and 43 will represent the traveltimes of the acoustic impulses between the transmitter and the receiver over the upper ones of the intervals.

With the combination of the quantities measured by the above circuit in mind and adopting the convention that when voltage-producing terminal pairs are interconnected with unlike terminals, as minus to plus, tied together—then the voltages add, whereas with like terminals, as minus to minus, tied together—the voltages are differenced. Thus, the $\Delta t$'s when the receivers are positioned adjacent the upper intervals will be added to the $\Delta t$'s between the receivers when they are positioned adjacent the lower intervals and the total traveltimes of the transmitter-receiver combination when it is adjacent the lower intervals will also be added to the receiver $\Delta t$'s while the total transmitter-receiver travel times adjacent the upper intervals will be subtracted. Thus, the signal supplied to the chart recorder 50 for recording will be the corrected log of the acoustical traveltime $\Delta t$ over the lower interval. This is clearly seen from the above description of the method of this invention when taken in conjunction with the above description of a suitable circuit. The chart recorder 50 is a conventional chart recorder having a pen-recording element with the chart record being driven by a synchromotor 51. Of course, the recording pen on recorder 50 should be positioned along the chart record so that its depth corresponds to the location of the lower interval.

Simultaneously with the recording of the corrected $\Delta t$ log, a roughness log is also recorded on a chart recorder 52. The roughness log is equal to the corrected $\Delta t L$ minus $\Delta t L$ or $$\tfrac{1}{2}(\Delta t U + \Delta t L + t t L - t t U) - \Delta t L$$

or $$\tfrac{1}{2}(\Delta t U - \Delta t L + t t L - t t U)$$

It is seen that the dual receiver measurement over the upper interval is added to the total travel time over the lower interval and the total traveltime over the upper interval and dual receiver measurement over the lower interval are both subtracted. This results in a signal that is proportional to twice the roughness factor. The recorder 52 can be adjusted to record one half of this signal. Chart recorder 52 is similar to the chart recorder 50 with the chart record being driven synchromotor 53. Both the synchromotors 51 and 53, of course, are coupled to the synchrogenerator 17 which is driven by the measuring sheave 16.

From the above description of the apparatus shown in FIGURE 4, it is clear that an apparatus has been provided for performing the method of this invention. More particularly, the apparatus will add the dual receiver logs obtained over both the upper and the lower intervals to the transmitter-receiver log obtained over the lower interval and subtract the transmitter-receiver log obtained over the upper interval. This will, of course, provide a corrected differential traveltime log over the lower interval. In addition, the system will provide a roughness log in which the dual receiver differential traveltime log over the lower interval is subtracted from the corrected differential traveltime over the lower interval.

Figure 5:
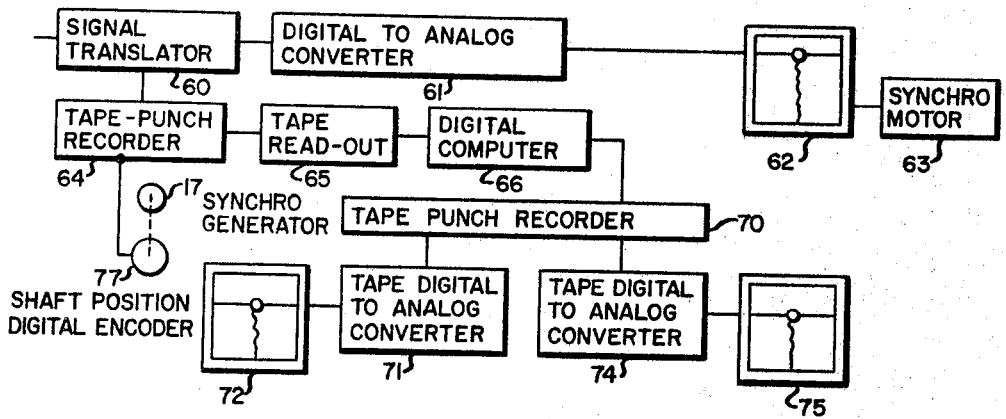
FIGURE 5 is a block diagram of a second logging system suitable for practicing the method of this invention.

Referring to FIGURE 5, there is shown a system using a digital recorder and computer for performing the method of this invention. In FIGURE 5 the signal translator 60 is of a design which will measure the time intervals between the transmitter pulse and the two receiver signals and convert the time intervals to related digital numbers. More particularly, the translator 60 can incorporate a commercially available digital time measuring circuit in which one digital counter is started by the transmitter signal and stopped by the first receiver signal; a separate digital counter can then be used to measure the time interval between the two receiver signals. The signal from the translator 60 representing the traveltime between the two receivers is supplied to a digital to analog convertor 61 which converts the digital signal to an analog signal that is recorded on a recorder 62. Recorder 62 is a conventional chart recorder and thus supplies the normal two receiver log presently in use. The chart record of the recorder 62 is driven by synchromotor 63 which is coupled to the synchrogenerator 17 not shown in FIGURE 5. The signal translator 60 also supplies the digital signals representing the traveltime between the transmitter and the near receiver and between the two receivers to a tape punch recorder 64; also, depth information is fed into the tape punch recorder from a shaft position digital encoder 77 coupled to synchrogenerator 17. The tape punch recorder 64 is a commercially available tape punch recorder that will record the digital signals received from the signal translator 60 on a punched tape. The recorded tape from recorder 64 is fed to a tape readout device 65 which reads the information contained on the tape and supplies it to a digital computer 66. Digital computer 66 is a commercially available digital computer which is programmed to perform the operations set forth above for the method of this invention. More particularly, the computer will add the $\Delta t$'s of the acoustic impulse between the two receivers when they are positioned adjacent the upper and the lower interval, to the total traveltimes of the transmitter-receiver combination when it is positioned adjacent the upper interval and subtract the transmitter-receiver total traveltime measured adjacent the lower interval and divide the results by two to obtain the corrected log. This result will be available in a digital form which may be recorded on a second tape punch recorder 70. The tape punch recorder 70 can be coupled to a tape digital to analog converter 71, in order to convert the tape signals to a related analog signal. The analog signal can then be recorded on a chart recorder 72 where the computer derived information is plotted as a function of the associated depth numbers stored on the tape. The digital recorder 66 can also be programmed to obtain the roughness log by subtracting the receiver traveltime when the receivers are positioned adjacent the lower interval from the corrected traveltime and supply this as an additional signal to the tape punch recorder 70. This signal can be converted to an analog signal by the tape digital-to-analog converter 74. The analog signal from the converter 74 is then recorded on a recorder 75 as a function of depth. The programming of a digital recorder and the converting of signals to a punched tape and reconverting a punched tape to an analog signal is well understood by those skilled in the art of digital recorders. Further, all of the units shown in FIGURE 5 for performing these functions are commercially available.

From the above description, it is easily seen that the method of this invention may be performed by either analog equipment or digital measuring equipment. Further, it is seen that the method of this invention will provide both a differential traveltime log that is corrected for borehole effects and a log which indicates the roughness or change in the diameter of the borehole.

We claim as our invention:
1. An acoustic velocity well logging process, comprising:
   producing unit differential traveltime measurements by maintaining two transducers that are operated alike in respect to the transmissions and receptions of acoustic impulses at the ends of a substantially vertical measuring interval having a unit length and measuring the differences between the times required for acoustic impulses to travel between each of the transducers and a point that is located at a fixed distance from the measuring interval;
   producing unit total traveltime measurements by maintaining an acoustic transmitter and an acoustic receiver at the ends of a measuring interval having said unit length and measuring the times required for the acoustic impulses to travel from the transmitter to the receiver;
   producing a corrected differential traveltime measurement across the lower one of a pair of adjacent depth intervals that each have a length equalling said unit length (corrected $\Delta tL$) by measuring said unit differential traveltime across the upper and lower ones of said depth intervals ($\Delta tU$ and $\Delta tL$), measuring said unit total traveltimes across the upper and lower ones of said depth intervals ($ttU$ and $ttL$); and
   producing a first quantity related to the sum of said differential traveltimes across the upper and lower ones of said depth intervals and said total traveltime measurement across the lower interval, producing a second quantity related to the difference between said first quantity and said total traveltime measurement across the upper interval, said second quantity being related to the corrected differential traveltime across the lower interval.

2. The process of claim 1 in which the point utilized in the unit differential traveltime measurements is located above the measuring interval and a corrected differential traveltime across the upper one of said pair of depth intervals is produced by producing a first quantity related to the sum of said differential traveltimes across the upper and lower ones of said depth intervals and said total traveltime measurement across the upper interval, producing a second quantity related to the difference between said first quantity and said total time measurement across the lower interval, said second quantity being related to the corrected differential traveltime across the upper interval.

3. In an acoustic well logging process in which a three-transducer logging instrument is operated within the borehole of the well so that acoustic impulses are produced and received by transducers contained in said instrument, quantities are produced which are related to the intervals between appearances of said impulses at said transducers and quantities are produced which are related to the depth of said logging instrument within the borehole, the combination of steps comprising:
   producing first quantities related to the times between the successive appearance of individual ones of said impulses at each of a pair of transmitting and receiving transducers while the transmitting-receiving transducers are (a) located in a first portion of said logging instrument and separated by a unit length measuring interval and (b) disposed in succession adjacent to the boundaries of each of a series of depth intervals which are each contiguous and equal to the length of said unit length measuring interval;
   producing second quantities related to the times required for said impulses to travel between a pair of transducers that are operated alike in respect to transmissions and receptions of acoustic impulses while the like-operated transducers are (a) located in a second portion of said logging instrument and spaced apart by an interval of $1/n$ times the length of said unit length measuring interval, where $n$ is an integer, and (b) disposed in succession adjacent to the boundaries of each of a series of depth intervals which are each contiguous and equal to the spacing between the like-operated transducers;
   producing third quantities related to, respectively, (a) those of said first quantities which are produced when said unit length measuring interval is adjacent to each of at least two contiguous depth intervals each equaling the measuring interval and (b) those of said second quantities that correspond to the total of $n$ of said second quantities that are produced when the interval between the like-operated transducers is, in succession, adjacent to $n$ contiguous portions of each of said at least two depth intervals;
   combining said third quantities with each other and recording indications of the variations of the resultant combinations with the depth of said logging instrument within the borehole.

4. In an acoustic well logging process in which a logging instrument is operated within the borehole of the well so that acoustic impulses are produced and received by transducers contained in said instrument, quantities are produced which are related to the time intervals between appearances of said impulses at said transducers and quantities are produced which are related to the depth of said logging instrument within the borehole, the combination of steps comprising:

producing first quantities related to the times required for said impulses to travel betweeen a first pair of transducers while said first pair of transducers are (a) located in a first portion of said logging instrument and separated by a unit length measuring interval and (b) disposed in succession adjacent to the boundaries of each of a series of depth intervals which are each contiguous and equal to the length of said unit length measuring interval;

producing second quantities related to the times required for said impulses to travel between a second pair of transducers while said second pair of transducers are located in a second portion of said logging instrument and spaced by an interval of $1/n$ times the length of said unit length measuring interval, where $n$ is an integer, and (b) disposed in succession adjacent to the boundaries of each of a series of depth intervals which are each contiguous and equal to the spacing between said second transducers;

producing third quantities related to, respectively, (a) those of said first quantities which are produced when said unit length measuring interval is adjacent to each of at least one depth interval equaling the measuring interval and (b) those of said second quantities that correspond to the total of $n$ of said second quantities that are produced when the interval between said second pair of transducers is in succession adjacent to $n$ contiguous portions of said depth interval;

combining said third quantities with each other and recording indications of the variations of the resultant combinations with the depth of said logging instrument within the borehole.

5. An acoustic well logging process, which comprises:
measuring the variations with depth of the total traveltimes of acoustic impulses traveling across a unit length measuring interval from a transmitter to a receiver as a first portion of a logging instrument moves into positions adjacent to each of a series of depths within the borehole of a well and producing reproducible digital indications of quantities proportional to said measurements;

measuring the variations with depth of the differential traveltime of acoustic impulses traveling across a unit length measuring interval from one to another of a pair of transducers that are operated alike in respect to the productions and receptions of acoustic impulses at a later time when another portion of the same instrument moves into positions adjacent to said depths and producing reproducible digital indications of quantities proportional to said differential traveltime measurements;

combining the reproducible digital indications of the total traveltime measurements with the reproducible digital indications of the differential traveltime measurements and recording indications of the resultant combination.

6. An acoustical logging system comprising:
a downhole instrument having three transducers spaced along a vertical line and including at least one transducer capable of generating acoustical impulses, said transducers being spaced to define two equal measuring intervals, said downhole instrument also including means for generating electrical transducer signals related in time to the occurrences of acoustical impulses at each transducer;

cable means for suspending the downhole instrument in a borehole and transmitting electrical signals from the instrument to a recording means located at the surface;

a depth measuring means disposed to measure the depth of the instrument in the borehole and generate an electrical depth signal related thereto;

said recording system including means for producing quantities related to the elapsed times between the occurrences of acoustical impulses at one of said transducers and a second transducer;

said recording system being coupled to the depth measuring means to record in relation to the measured depth;

said recording system including two chart recorders having two curve following devices, the elapsed time between transducers of the same type being recorded as a continuous curve on one recorder and the elapsed time between transducers of different types being recorded as a continuous curve on the second recorder, the curve followers of both recorders being positioned at locations equal to the measuring interval with respect to the recording means on the chart recorders;

circuit means scoupled to said curve followers to generate an electrical signal related to the magnitude of the recorded curve;

a circuit means for combining the electrical signals of the curve followers related to the magnitude of the recorded curve in accordance with the formula $$\tfrac{1}{2}(\Delta tU + \Delta tL + ttL - ttU)$$

7. An acoustic velocity well logging process, comprising:

producing unit differential traveltime measurements by maintaining two transducers that are operated alike in respect to the transmissions and receptions of acoustic impulses at the ends of a substantially vertical measuring interval having a unit length and measuring the differences between the times required for acoustic impulses to travel between each of the transducers and a point that is located at a fixed distance from the measuring interval;

producing unit total traveltime measurements by maintaining an acoustic transmitter and an acoustic rereciver at the ends of a measuring interval having said unit length and measuring the times required for the acoustic impulses to travel from the transmitter to the receiver;

producing a corrected differential traveltime measurement across the lower one of a pair of adjacent depth intervals that each have a length equalling said unit length (corrected $\Delta tL$) by measuring said unit differential traveltime across the upper and lower ones of said depth intervals ($\Delta tU$ and $\Delta tL$), measuring said unit total traveltimes across the upper and lower ones of said depth intervals ($ttU$ and $ttL$);

producing a first quantity related to the sum of said differential traveltimes across the upper and lower ones of said depth intervals and said total traveltime measurement across the lower interval, producing a second quantity related to the difference between said first quantity and said total traveltime measurement across the upper interval, said second quantity being related to the corrected differential traveltime across the lower interval; and in addition indicating the variations with depth between said corrected differential traveltime measurement across the lower one of said depth intervals (corrected $\Delta tL$) and said unit differential traveltime across the lower one of said depth intervals ($\Delta tL$).

8. An acoustic method for logging the depths of variations in the diameter of a borehole, which method comprises:

measuring the corrected differential traveltimes across a depth interval and the depth of said depth interval;

measuring across said depth interval the unit differential traveltime corresponding to the differences between the times required for acoustic impulses to the differences between the times required for acoustic impulses to travel between a point located on one side of a pair of transducers and each of a pair of transducers that are positioned adjacent to the ends of said depth interval when the transducers are operated alike in respect to the transmission and reception of acoustic impulses; and indicating the variations with depth in the differences between said corrected differential traveltime and said unit differential traveltime.

References Cited

UNITED STATES PATENTS

| 3,081,838 | 3/1963 | Platt | 181—.5 |
| 3,093,811 | 6/1963 | Schneider | 181—.5 |
| 3,207,256 | 9/1965 | Blizard | 181—.5 |

BENJAMIN A. BORCHELT, *Primary Examiner.*

W. KUJAWA, *Assistant Examiner.*